United States Patent [19]

Becht et al.

[11] Patent Number: 4,481,865

[45] Date of Patent: Nov. 13, 1984

[54] VACUUM BRAKE BOOSTER

[75] Inventors: Reimund Becht, Frankfurt-Höchst; Peter Böhm, Frankfurt am Main, both of Fed. Rep. of Germany

[73] Assignee: ITT Industries, Inc., New York, N.Y.

[21] Appl. No.: 142,298

[22] Filed: Apr. 21, 1980

[30] Foreign Application Priority Data

May 10, 1979 [DE] Fed. Rep. of Germany ....... 2918913

[51] Int. Cl.³ ............................................. F15B 9/10
[52] U.S. Cl. ............................. 91/369 A; 91/376 R; 92/168; 92/169; 60/547.1
[58] Field of Search ..................... 92/48, 49, 107, 108, 92/166, 138, 165 R, 165 PR, 166, 93, 169 R, 168; 91/369 A, 369 B, 369 R, 376 R

[56] References Cited

U.S. PATENT DOCUMENTS 11,549 8/1854 Ellis ....................................... 92/107
3,172,338 3/1965 Ackerman ............................ 92/107

FOREIGN PATENT DOCUMENTS 2922299 12/1979 Fed. Rep. of Germany ... 91/369 A

Primary Examiner—Paul E. Maslousky
Attorney, Agent, or Firm—James B. Raden; Marvin M. Chaban

[57] ABSTRACT

A brake booster comprising a housing which is divided into a vacuum chamber and a working chamber by a movable wall. A tube is disposed in the housing coaxial of the longitudinal axis thereof having its ends fastened to the end walls of the housing. The tube is provided with longitudinal slots in the vacuum chamber which are open remote from the movable wall. Parts of the movable wall project through the slots and are fastened to a valve housing extending into the tube, the valve housing containing a control valve which controls the pressure in the working chamber. This arrangement allows a short overall length of the booster and enables easy assembly thereof with respect to known prior art brake boosters.

6 Claims, 4 Drawing Figures

VACUUM BRAKE BOOSTER

BACKGROUND OF THE INVENTION

The present invention relates to a brake booster, in particular for automotive vehicles, having a vacuum casing divided into a vacuum chamber and a working chamber by a wall substantially of rigid and plate-shaped design and axially movably arranged in the vacuum casing, and a tube extending through the vacuum casing axially having its ends fastened to the end walls of the vacuum casing with the axially movable wall slideably sealed to the outer surface thereof. A mechanically actuatable control valve adapted to connect the working chamber to the vacuum chamber pressurized by vacuum, or to connect the working chamber to atmosphere has a control valve housing axially movably guided in the tube and rigidly connected to the axially movable wall through longitudinal slots in the tube. A push rod for a master brake cylinder is connected to the valve housing or to the axially movable wall.

A brake booster of the aforementioned type is described in the copending U.S. patent application Ser. No. 061,113, filed July 26, 1979 of J. Belart and F. Wieneike assigned to the same assignee as the present application.

In this known brake booster, the slots through which the axially movable wall is connected to the valve housing of the control valve are formed close to the working chamber in the tube extending through the vacuum casing. The axially movable wall is guided on the tube adjacent the end of the slots remote from the working chamber in a sealed relationship to the tube, the length of this guiding on the tube corresponding to the booster travel of the axially movable wall. The disadvantage of this arrangement is that it requires a large overall length, with the overall length being defined as the distance between the end walls of the vacuum casing because it is on these end walls that the mounting flanges are provided.

Further, the arrangement of the recesses on the end of the tube close to the working chamber makes it necessary for the valve housing in the tube to extend up to the end of the recesses remote from the working chamber in order to be guided in the tube in a sealed relationship thereto, otherwise a short circuit would exist between working chamber and vacuum chamber.

The connection of the axially movable wall with the valve housing is established by a split disc which is secured to the axially movable wall by screws and engages, with its radially inwardly extending area, grooves formed on the cylindrical outer surface of the valve housing.

Assembly of the split disc to provide a connection between the axially movable wall and the valve housing is possible with difficulty only, because the connecting members, such as disc and screws, are not easily accessible.

SUMMARY OF THE INVENTION

It is, therefore, an object of the present invention to provide a brake booster of the above-mentioned type which has small overall length, a simple construction and affords ease of assembly.

A feature of the present invention is the provision of a brake booster comprising: a housing having a longitudinal axis; a movable wall disposed in the housing coaxial of the axis dividing the housing into a vacuum chamber and a working chamber; a tube disposed in the housing coaxial of the axis having its ends fastened to end walls of the housing and upon which the movable wall is in an axially slideably sealed relationship; a control valve housing disposed coaxial of the housing extending into the interior of the tube for axial guided movement therein, the control valve housing including therein a mechanically actuated control valve adapted to connect the working chamber to the vacuum chamber which contains a vacuum therein or to atmosphere, the control valve housing having a predeterminedly shaped profile formed on the end thereof in the vacuum chamber; a push rod connected to one of the valve housing and the movable wall disposed in the tube coaxial of the axis to actuate a piston of a master brake cylinder extending into the tube toward the movable wall; and longitudinal slots provided through the tube in the vacuum chamber through which the movable wall extends to engage the profile to establish a connection between the valve housing and the movable wall, the slots being open at the end of the tube remote from the movable wall.

This construction obviates the necessity for a sealing guide of the axially movable wall and the valve housing on the end of the recesses remote from the working chamber, resulting in an overall length of the brake booster which is substantially reduced compared to the state of the art. In addition, the axially movable wall, with its parts extending through the tube recesses, slides easily onto the tube through the slots which are open towards the tube end, without there being the need to fit the connecting members between axially movable wall and valve housing in a complicated operation only after the axially movable wall has been mounted in position.

In an advantageous embodiment of the present invention, the profile may be a radially projecting collar engaged from behind by the axially movable wall which bears thereagainst in the boosting direction. In this arrangement, the connection between valve housing and movable wall may be a bayonet connection affording ease of assembly.

In another embodiment, the connection may be provided by radially inwardly extending indentations on the axially movable wall, which engage the collar from behind and are provided when the axially movable wall is mounted in position.

To determine the position of the axially movable wall with the brake booster not actuated, the ends of the slots extending axially towards the working chamber may be stops for the axially movable wall.

The axially movable wall is advantageously of cylindrical configuration relative to the tube axis in its area enclosing the tube.

The valve housing may include a cylindrical housing receiving valve seat and closure member, and a tubular sleeve fastened to the housing and profiled at its free end extending towards the vacuum chamber. This two-part design enables the housing to be made of a plastic material which is easy to manufacture, while the sleeve, being the member on which the forces transmitted by the axially movable wall bear, may be made of steel. In this arrangement, the sleeve is advantageously in positive engagement with the housing, and the housing may include a radially circumferential edge on its cylindrical outer surface which is engaged by the sleeve. The arrangement affords ease of manufacture and assembly if a radially inwardly extending collar of the sleeve is in abutment with the circumferential edge on one side and if a radially inwardly extending indentation of the sleeve is in abutment with the circumferential edge on the other side.

Arranged between the tube and the housing is a seal which may be a rolling diaphragm. The rolling diaphragm affords the advantage of obviating the necessity for a special machining operation on housing and tube for abutment with a slide seal.

The axially movable wall is advantageously guided on the tube in the axial direction. In this arrangement the tube may be enclosed by a sleeve made of a material having good sliding properties and having recesses corresponding to the recesses of the tube. In this arrangement, the ends of the sleeve recesses extending axially towards the working chamber may be stops for the axially movable wall. It will be particularly advantageous in this construction, if the sleeve, at the ends of the recesses extending towards the working chamber, includes projections which extend radially inwardly into the recesses of the tube and, in addition function as stops for the axially movable wall. These projections ensure the correct mounting position of the sleeve relative to the tube.

At its end remote from the working chamber, the tube may include a radially inwardly extending collar, with the depth of the slots extending radially inwardly being less than the amount the collar extends radially inwardly. Thus, in spite of the slots being open towards the tube end, a radially inner closed ring imparting stability to the tube end is formed by the collar.

At the tube end remote from the working chamber, axially projecting threaded bolts may be provided for fastening to a mounting flange of a master cylinder. Instead of the threaded bolts, axially extending threaded blind-end bores may be provided at the tube end remote from the working chamber. Compared to the otherwise relatively thin wall of the tube, the wall thickness of the tube may be reinforced in the area of the threaded bolts or the threaded blind-end bores. In order to be able to mount the axially movable wall without difficulty in spite of this reinforcement, the axially movable wall may be recessed in its area lying axially opposite the reinforcement, the amount of radial extension of this recess from the longitudinal axis of the brake booster being greater than the distance of the radially largest extension of the reinforcement from the longitudinal axis of the brake booster.

In order to prevent abutment of the valve housing with the reinforcement of the tube when a booster stroke takes place, the valve housing may be provided with a cut-out portion in the area of the reinforcement.

The axially movable wall may bear against the valve housing in opposition to the boosting direction. This is of particular advantage if the braking operation takes place prior to starting of the engine, with atmospheric pressure prevailing in both the working chamber and the vacuum chamber. If there were no support for the axially movable wall in opposition to the boosting direction on the valve housing, the valve housing, but not the axially movable wall, would move in the direction of the booster stroke. If during this braking operation the engine were started, resulting in the development of a vacuum in the vacuum chamber, the axially movable wall would abruptly move in the direction of the booster stroke and hit against the profile of the valve housing which might become damaged thereby. In an embodiment of this arrangement, the valve housing may include at its end extending into the vacuum casing a radially outwardly open, circumferential groove into which the axially movable wall engages axially largely without clearance. In this arrangement, the groove is advantageously produced by chipless forming.

In a profile which is formed by a collar, the support may also be formed by a stop of the axially movable wall in abutment with the side of the collar remote from the working chamber, with the stop being a radially inwardly extending indentation allowing ease of manufacture.

To guide the valve housing in the tube, a slide ring may be arranged between the tube and the valve housing. In an advantageous embodiment of this invention, the slide ring may have radially outwardly extending projections which are in locking engagement with suitable recesses of the tube. This design permits ease of assembly of the slide ring.

The slide ring may also bear against valve housing supporting surfaces extending in the direction of the vacuum casing and clamp the movable wall relative to the profile in the boosting direction. The slide ring thereby fulfills not only the function of guiding the valve housing but forms at the same time the support for the axially movable wall in opposition to the boosting direction.

In order to avoid the slide ring abutting on the reinforcement of the tube wall in the area of the threaded bolts or the threaded blind-end bores when a booster stroke takes place, the slide ring may include a cut-out portion in the area of this reinforcement.

The supporting surfaces for the slide ring on the valve housing may be provided in the area of the cut-out portions on the valve housing and may be engaged from behind by radially inwardly extending cams of the slide ring.

To compensate for the clearances between tube and valve housing which are due to manufacturing tolerances, the wall of the slide ring may be of meandered cross-section in the axial direction.

The axially movable wall may include a sheet member produced by chipless forming and a rolling diaphragm which rests thereon on the working-chamber side and is sealingly fastened to the tube radially inwardly and to the vacuum casing radially outwardly. The rolling diaphragm obviates the need for special machining of the outer surface of the tube for the abutting engagement with a slide seal.

Advantageously, the rolling diaphragm has radially inwardly an annular bead which is in abutment with an annular surface extending in opposition to the boosting direction. When the working chamber is pressurized by atmospheric pressure, the atmospheric pressure will urge the annular bead against the annular surface whereby a particularly tight seal is accomplished. In this arrangement, the annular surface may be formed on the tube. If the tube is enclosed by a sleeve, the annular surface may also be the end surface of the sleeve close to the working chamber.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
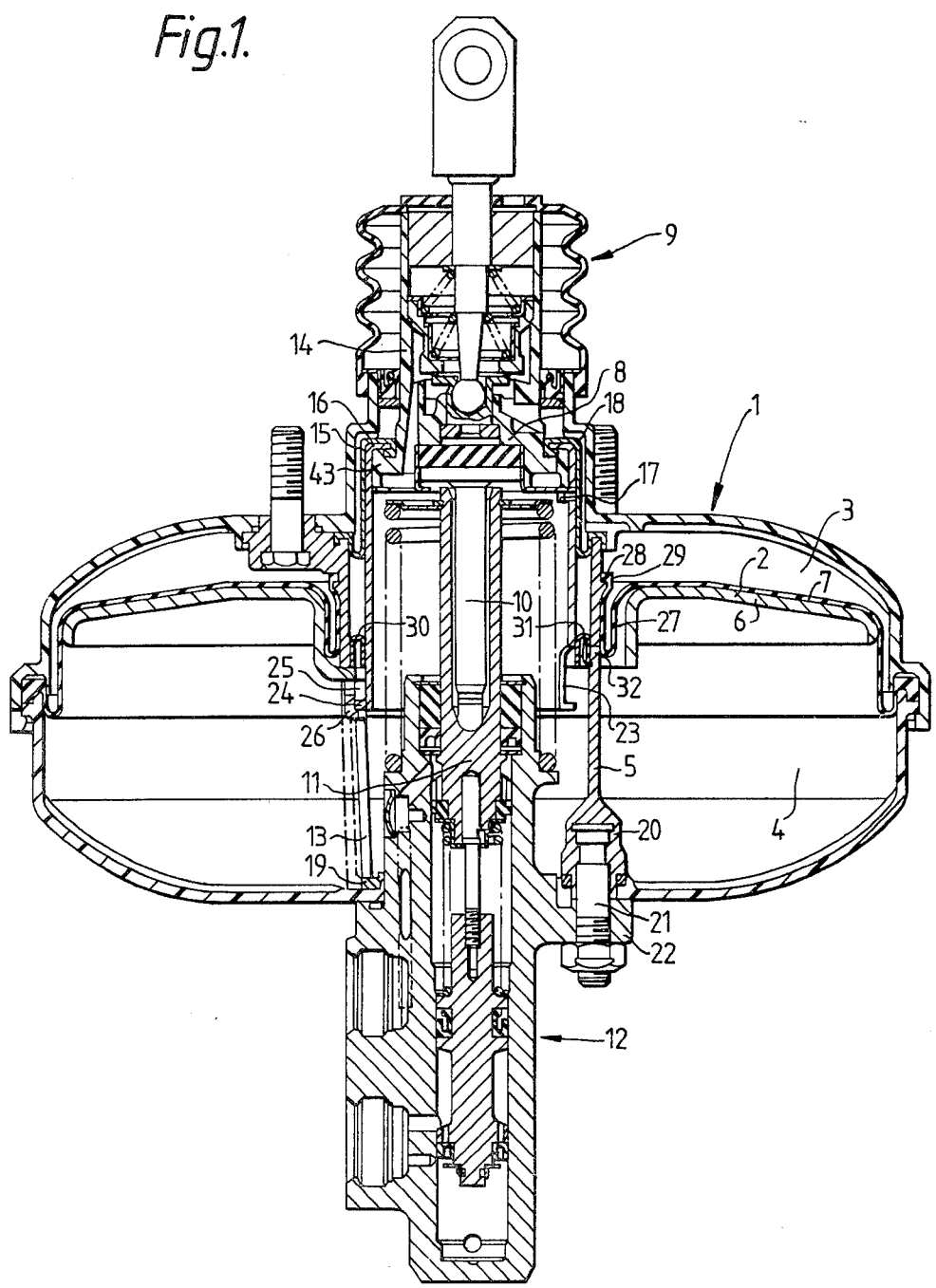
FIG. 1 is a longitudinal cross-sectional view of a first embodiment of a brake booster in accordance with the principles of the present invention.
Figure 2:
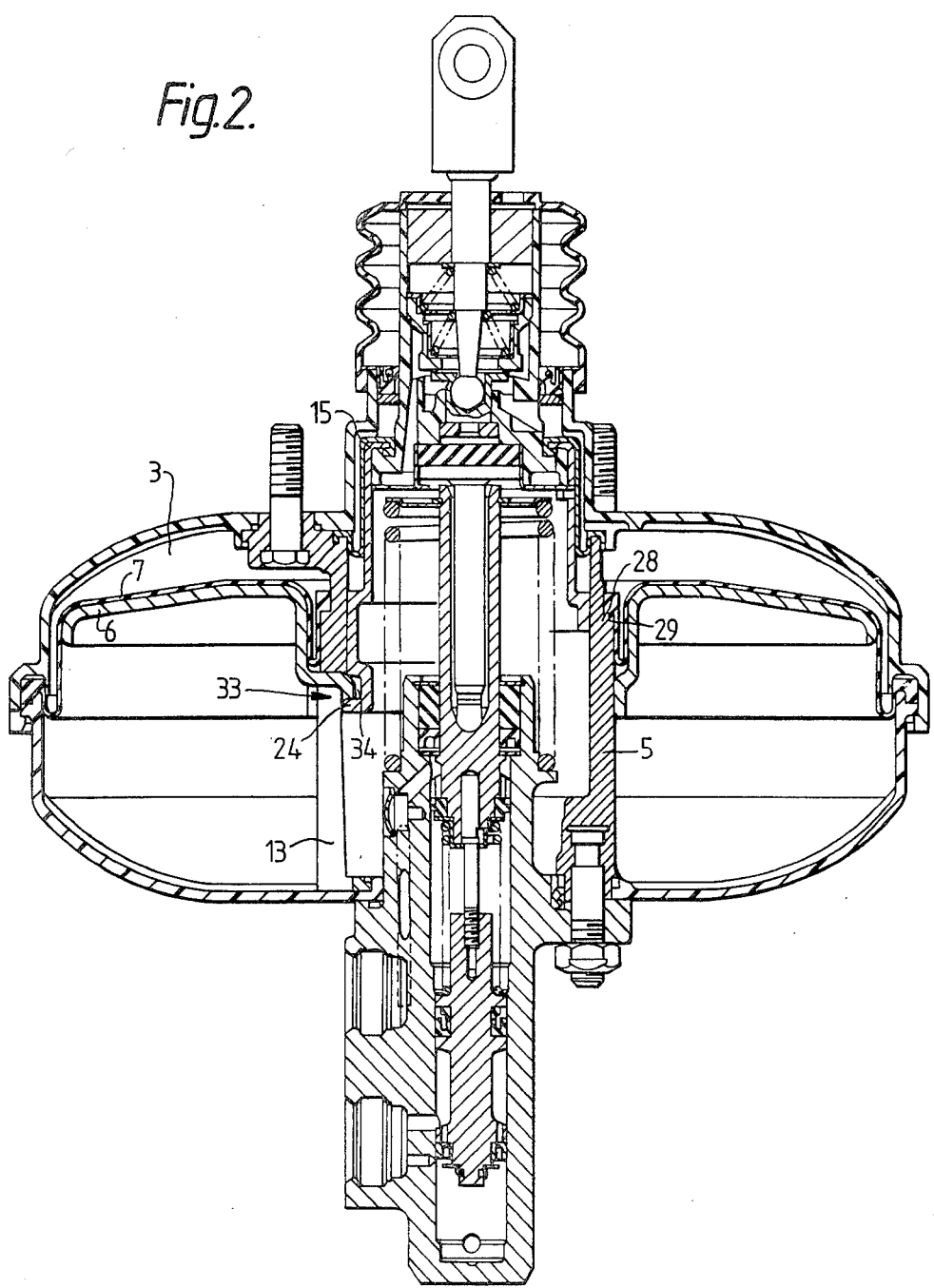
FIG. 2 is a longitudinal cross-sectional view of a second embodiment of a brake booster in accordance with the principles of the present invention.
Figure 3:
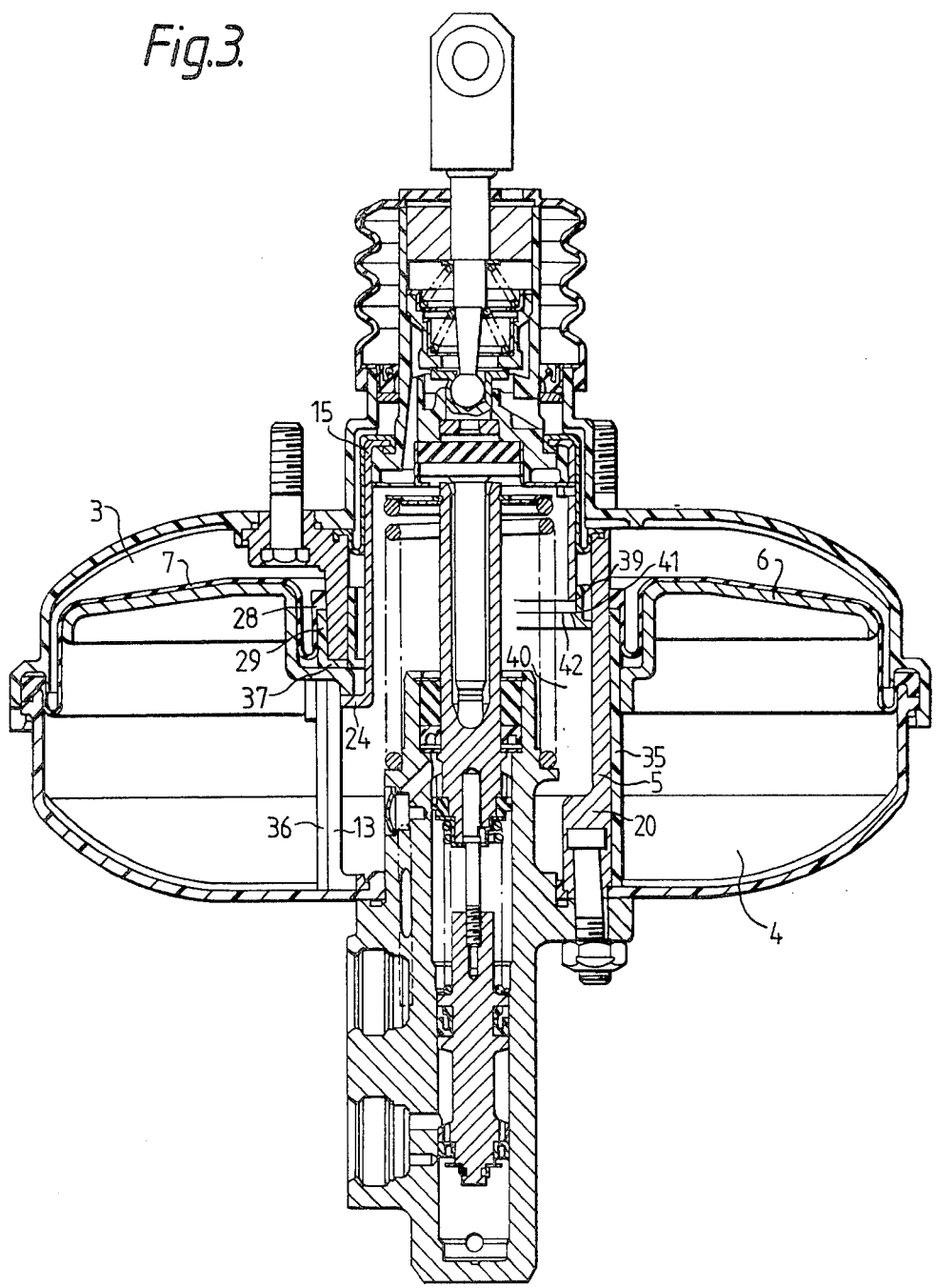
FIG. 3 is a longitudinal cross-sectional view of a third embodiment of a brake booster in accordance with the principles of the present invention.

The brake booster illustrated in FIGS. 1 to 3 includes a vacuum casing 1 which is divided into a working chamber 3 and a vacuum chamber 4 by an axially movable wall 2. Extending through vacuum casing 1 and axially movable wall 2 is a tube 5 having its ends fastened to the end walls of vacuum casing 1.

Axially movable wall 2 includes a rigid, plate shaped sheet member 6 and a rolling diaphragm 7 which rests thereon on the working-chamber side and is sealingly fastened to tube 5 on its radially inward end and to vacuum casing 1 on its radially outward end.

The valve housing 8 of a mechanically actuatable control valve 9 is slideably arranged in the end of tube 5 close to working chamber 3. Via this control valve 9, working chamber 3 is connected to vacuum chamber 4 in the inactive position, with the axially movable wall 2 being in the position illustrated. When control valve 9 is actuated, the connection between working chamber 3 and vacuum chamber 4 is interrupted, and working chamber 3 is connected to atmosphere so that wall 2 on which atmospheric pressure acts will move in the boosting direction (to the left in the drawing).

Connected to valve housing 8 is one end of a push rod 10 which with its other end acts on an actuating piston 11 of a master cylinder 12 extending into tube 5.

At its end in vacuum chamber 4, tube 5 includes slots 13 open towards this end and having sheet member 6 of axially movable wall 2 extending therethrough to establish a connection between axially movable wall 2 and valve housing 8 by positively engaging a profile of valve housing 8.

Valve housing 8 includes an approximately cylindrical housing 14 made of plastics containing the valve seats and the closure members sleeve 15 having one end thereof fastened to housing 8 its other end being profiled to connect sheet member 6 to valve housing 8.

Sleeve 15 positively engages housing 14 by having a radially inwardly extending collar 16 formed on one end thereof in abutment with the one side of a radially extending circumferential edge 43 of the cylindrical outer surface of housing 14 and a radially inwardly extending indentation 17 formed in sleeve 15 in abutment with the other side of edge 43.

A rolling diaphragm 18 is arranged between tube 5 and housing 14.

At its end remote from working chamber 3, tube 5 includes a radially inwardly extending collar 19 extending radially inwardly by a greater amount than the depth of the radially inwardly extending slot 13. Thus, in spite of slots 13 being open towards this end of tube 5, a closed ring is provided keeping this end of tube 5 stable.

At its end remote from working chamber 3, tube 5 is provided with reinforcements 20 in which axially projecting threaded bolts 21 are inserted for fastening the brake booster to the mounting flange 22 of master cylinder 12.

In order to avoid sleeve 15 abutting on reinforcement 20 when a booster stroke takes place, sleeve 15 may be provided with a cut-out portion 23 in the area of reinforcement 20.

In the brake booster illustrated in FIG. 1, the profile on sleeve 15 is formed by a radially outwardly projecting collar 24 which is engaged from behind by a radially inwardly extending indentation 25 of sheet member 6. Through indentation 25 axially movable wall 2 bears against collar 24 in the boosting direction.

A second radially inwardly extending indentation 26 of sheet member 6 abuts on the other side of collar 24 of sleeve 15 so that axially movable wall 2 is also supported in opposition to the boosting direction.

In its area lying axially opposite reinforcement 20, sheet member 6 includes a recess 27 which extends radially from the longitudinal axis of the brake booster by a larger amount than the distance of the radially largest extension of reinforcement 20 from the longitudinal axis of the brake booster.

Thus, following mounting of rolling diaphragm 7, sheet member 6 can be mounted in position easily by sliding it onto tube 5 and fastening it to sleeve 15 of valve housing 8 by providing indentations 25 and 26.

Radially inwardly, rolling diaphragm 7 has an annular bead 28 which is in abutment with an annular surface 29 extending from tube 5 facing working chamber 3 which is in opposition to the boosting direction and is urged against annular surface 29 by atmospheric pressure when the latter pressurizes working chamber 3, thus, increasing the sealing effect.

To guide sleeve 15 in tube 5, a slide ring 30 is arranged between these two parts which includes radially outwardly extending projections 31 which are in locking engagement with suitable recesses 32 of tube 5.

In the brake booster illustrated in FIG. 2, the profile on sleeve 15 is likewise formed by a radially projecting collar 24 which, however, is not a closed circumferential collar but includes cut-out portions. A bayonet connection 33 is formed with the parts of sheet member 6 extending through slots 13 and engaging collar 24 from behind and bearing thereagainst in the boosting direction.

This permits simplified assembly because, after sheet member 6 is slid onto tube 5, only a relative turning of sheet member 6 and sleeve 15 is necessary to engage collar 24 from behind.

Since the portion of sheet member 6 surrounding tube 5 is of cylindrical configuration relative to the tube axis and abuts on the cylindrical outer surface of tube 5, a good guiding of sheet member 6 is achieved.

A radially outwardly open groove 34 is provided by chipless forming adjacent to collar 24, the groove being engaged by sheet member 6 axially largely without clearance when collar 24 is engaged from behind, thereby providing a support for sheet member 6 on sleeve 15 in opposition to the boosting direction.

Since the area of sleeve 15 adjacent to groove 34 in the direction of working chamber 3 has approximately the same diameter as the internal diameter of tube 5, sleeve 15 is also axially guided.

As in FIG. 1, rolling diaphragm 7 includes radially inwardly an annular bead 28 which is in abutment with an annular surface 29 formed in tube 5 and facing in opposition to the boosting direction.

In the brake booster illustrated in FIG. 3, the construction of the connection between sheet member 6 and sleeve 15 corresponds to that of FIG. 2.

Additionally, tube 5 is enclosed by a plastic sleeve 35 having slots 36 corresponding to slots 13 of tube 5.

With sleeve 35 made of plastics, it is not necessary to machine the cylindrical outer surface of tube 5 as a guide for sheet member 6.

Sleeve 35 has at the ends of slots 36 close to working chamber 3 projections 37 which extend radially inwardly into slots 13 of tube 5 and serve as stops limiting the displacement of sheet member 6 in the direction of working chamber 3.

The end surface of sleeve 35 close to working chamber 3 forms annular surface 29 with which annular bead 28 of rolling diaphragm 7 is in abutment.

Figure 4:
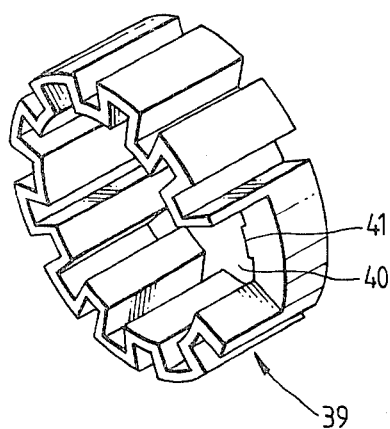
FIG. 4 is a perspective view of the slide ring of FIG. 3.

Arranged between tube 5 and sleeve 15 is a slide ring 39 which is also illustrated in FIG. 4.

The wall of slide ring 39 is of meandering cross-section in the axial direction.

In the area lying axially opposite reinforcement 20, slide ring 39 includes a cut-out portion 40 in order to prevent abutment with reinforcement 20 during a booster stroke.

In this area of cut-out portion 40, which overlaps with cut-out portion 23 of sleeve 15, slide ring 39 possesses radially inwardly extending cams 41 engaging from behind the end surface of sleeve 15 close to vacuum chamber 4 and forming a supporting surface 42.

In the area of slots 13, the end surface of slide ring 39 is in abutment with the parts of sheet member 6 extending through slots 13, the slide ring holding these against collar 24 without clearance.

While we have described above the principles of our invention in connection with specific apparatus it is to be clearly understood that this description is made only by way of example and not as a limitation to the scope of our invention as set forth in the objects thereof and in the accompanying claims.

We claim:

1. A brake booster for a braking system comprising a housing having first and second spaced opposing housing walls, a movable wall disposed in the housing between said spaced housing walls and dividing said housing into two chambers, axially aligned input and output members, means interconnecting said movable wall to said output member, a control valve assembly operated by said input member for controlling a pressure differential across said movable wall, a tubular memeber extending through the movable wall coaxially with the input and output members and connected to the opposing housing walls, said tubular member having longitudinal slot means disposed between said opposing housing walls with a portion of the interconnecting means extending through the slot means, said control valve assembly including a tubular valve body and being slidably disposed within said tubular member and generally parallel thereto, and a rolling diaphragm seal disposed between and sealingly engaging said tubular member and said said valve body, said diaphragm having one end affixed to said tubular valve body at the output end of the valve body, a main body portion of said diaphragm extending between the tubular body and the tubular member and generally parallel thereto, and the opposite end of said diaphragm affixed to the tubular member adjacent said first housing wall.

2. A brake booster according to claim 1, wherein said tubular valve body contains therein valve seats and closure members, said valve assembly including tubular sleeve fastened to said tubular valve body with its free end extending through said tubular member into one of said chambers, with the free end of said sleeve carrying thereon said interconnecting means.

3. A brake booster according to claim 2, wherein said tubular valve body includes a radially outwardly extending circumferential edge on its cylindrical outer surface which is engaged by said sleeve.

4. A brake booster according to claim 3, wherein there is a second rolling diaphragm seal disposed between said tubular member and said movable wall and said tube.

5. A brake booter according to claim 4, in which the body of said first rolling diaphragm body rests outwardly of the sleeve for a portion of the sleeve length.

6. A brake booster for a braking system comprising:
a housing having first and second spaced opposing axially spaced housing walls, a movable wall disposed in the housing between said spaced housing walls and dividing said housing into two chambers, axially aligned input and output members, means interconnecting said movable wall to said output member, a control valve assembly operated by said input member for controlling a pressure differential across said movable wall, a tubular member extending through the movable wall coaxially with the input and output members and connected to the opposing housing walls, said tubular member having longitudinal slot means disposed between said opposing housing walls with a portion of the interconnecting means extending through the slot means for connection to said output member, said control valve assembly slidably disposed within said tubular member and including a tubular valve body and tubular sleeve connected, for axial movement adjacent one of said housing walls, a rolling diaphragm having one end thereof sealingly affixed to the connection of said tubular valve body and said tubular sleeve and the other end of said rolling diaphragm affixed to said tubular member and said one housing wall.

* * * * *